US011856085B2

(12) United States Patent
Tojima et al.

(10) Patent No.: US 11,856,085 B2
(45) Date of Patent: Dec. 26, 2023

(54) INFORMATION MANAGEMENT SYSTEM AND METHOD FOR THE SAME

(71) Applicant: NOMURA RESEARCH INSTITUTE, LTD., Tokyo (JP)

(72) Inventors: Tatsuya Tojima, Tokyo (JP); Takeshi Kondo, Tokyo (JP); Yoshihito Aso, Tokyo (JP); Tatsuya Fuchigami, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 307 days.

(21) Appl. No.: 16/819,239

(22) Filed: Mar. 16, 2020

(65) Prior Publication Data

US 2020/0304291 A1    Sep. 24, 2020

(30) Foreign Application Priority Data

Mar. 18, 2019    (JP) ................................ 2019-049372

(51) Int. Cl.
*H04L 9/06*    (2006.01)
*H04L 9/30*    (2006.01)
(Continued)

(52) U.S. Cl.
CPC .......... *H04L 9/0637* (2013.01); *G06F 21/602* (2013.01); *H04L 9/30* (2013.01); *G06Q 50/265* (2013.01); *H04L 9/50* (2022.05)

(58) Field of Classification Search
CPC ..... H04L 9/0637; H04L 9/30; H04L 2209/38; G06F 21/602; G06Q 50/265
See application file for complete search history.

(56) References Cited

U.S. PATENT DOCUMENTS 8,554,912 B1 * 10/2013 Reeves ................. G06F 21/552
455/410
9,912,752 B1 * 3/2018 Davis .................. G06F 16/2365
(Continued)

FOREIGN PATENT DOCUMENTS

CN    108259169 A    7/2018
CN    108462568 A    8/2018
(Continued)

OTHER PUBLICATIONS

"Ethereum", Wikipedia, [online], Searched on Dec. 5, 2018, Retreaved on Mar. 12, 2020 from the Internet: <https://ja.wikipedia.org/wiki/%E3%82%A4%E3%83%BC%E3%82%B5%E3%83%AA%E3%82%A2%E3%83%A0> in Japanese and <https://en.wikipedia.org/wiki/Ethereum> in English; Cited in Specification.
(Continued)

*Primary Examiner* — Theodore C Parsons
*Assistant Examiner* — Alan L Kong
(74) *Attorney, Agent, or Firm* — Rankin, Hill & Clark LLP

(57) ABSTRACT

An information using device 300 adds an encryption public key held to a blockchain, an information holding device 200 transmits encrypted information as a result of acquiring the encryption public key from the blockchain 400 and encrypting the target information, the information management device 100 stores the encrypted information received, and transmits a storage destination address, the information holding device 100 adds the storage destination address of the encrypted information received to the blockchain 400, the information using device 300 acquires the storage destination address of the encrypted information, and accesses the storage address, the information management device 100 transmits the encrypted information at the storage destination address, in response to the access from the information (Continued)

using device 300, and the information using device 300 decrypts the encrypted information received, using an encryption secret key held.

9 Claims, 6 Drawing Sheets

(51) Int. Cl.
   *G06F 21/60* (2013.01)
   *G06Q 50/26* (2012.01)
   *H04L 9/00* (2022.01)

(56) References Cited

U.S. PATENT DOCUMENTS

| | | | | |
|---|---|---|---|---|
| 2007/0050513 | A1* | 3/2007 | Song | H04L 67/06 709/230 |
| 2010/0063841 | A1* | 3/2010 | D'Ambrosia | G06Q 10/10 726/4 |
| 2015/0074409 | A1* | 3/2015 | Reid | G06F 21/6218 713/171 |
| 2015/0324210 | A1* | 11/2015 | Carlson | G06F 11/328 710/10 |
| 2018/0183587 | A1* | 6/2018 | Won | H04W 4/70 |
| 2019/0207813 | A1* | 7/2019 | Uehara | G06F 21/64 |
| 2019/0342084 | A1* | 11/2019 | Mehedy | H04L 9/0825 |
| 2020/0019963 | A1 | 1/2020 | Nakamura | |
| 2020/0092088 | A1* | 3/2020 | Novotny | H04L 63/123 |
| 2020/0118124 | A1* | 4/2020 | Menon | H04W 12/40 |
| 2020/0159697 | A1* | 5/2020 | Wood | G06Q 20/3674 |
| 2020/0160947 | A1* | 5/2020 | Rasovsky | G16H 30/40 |

FOREIGN PATENT DOCUMENTS

| | | |
|---|---|---|
| CN | 108614878 A | 10/2018 |
| CN | 109144961 A | 1/2019 |
| EP | 3509006 A1 | 7/2019 |
| JP | 2017195627 A | 10/2017 |
| JP | 6326173 B1 | 5/2018 |
| WO | 2018043599 A1 | 3/2018 |
| WO | 2018124297 A1 | 7/2018 |

OTHER PUBLICATIONS

Japanese Office Action (JPOA) dated Nov. 18, 2022 issued in Japanese patent application No. 2019-049372.
"Blockchain Impact", Bitbank, Nikkei Business Publications, Inc., 1st Edition, Jun. 13, 2016, p. 219 and its English machine translation; Cited in JPOA.
Chinese Office Action (CNOA) dated Mar. 29, 2023 issued in Chinese patent application No. 202010189889.8.

* cited by examiner

INFORMATION MANAGEMENT SYSTEM AND METHOD FOR THE SAME

TECHNICAL FIELD

The present invention relates to an information management system for encrypting and storing information and decrypting the encrypted information to provide the information.

BACKGROUND ART

In recent years, blockchain, a distributed ledger technology, has been actively researched and developed. The blockchain is a growing list of ordered records known as blocks. Each block contains a timestamp and a link to the previous block. Once a block is included in the list, it cannot be changed retrospectively. Thus, the system is substantially impossible to be tampered with, and is used in virtual currency.

Ethereum, a kind of blockchain, is a blockchain platform for creating applications. Multiple applications can be created on Ethereum. Ethereum not only enables virtual currencies to be handled on the blockchain, but also enables creation of applications, on the Ethereum platform, adapted to process virtual currencies and information held.

CITATION LIST

Patent Literature

Non Patent Literature 1: "Ethereum", [online], [Searched on Dec. 5, 2018], Internet <https://en.wikipedia.org/wiki/% E3%82% A4% E3%83% BC % E3% 82% B5% E3% 83% AA % E3% 82% A2% E3% 83% A0>

SUMMARY OF INVENTION

Technical Problem

Ethereum has a feature similar to that of the blockchain. Specifically, once a block is added to the list and recorded on the blockchain, it cannot be deleted. The amount of data that can be stored in an Ethereum block is limited. Thus, a recordable amount of Ethereum data is limited. In view of such a limitation on the data amount, some blockchains enable large data to be stored. Thus, with such blockchains, applications requiring storage of large data can be free of such a limitation. However, due to the basic principle of blockchains, target data added to the blockchain cannot be deleted. Furthermore, a blockchain platform handling large data is plagued by a long processing time required, a huge total data amount handled thereon, and a high operation cost because the platform needs to be formed by high spec computers having sufficient data capacity to store the blockchain.

The present invention has been made in view of these problems, and an object of the present invention is to provide an information management system for managing information using a blockchain that can manage information flexibly while being free of limitation due to the specifications of the blockchain platform.

Solution to Problem

An information management system according to the present invention includes an information management device that transmits target information of an information holder stored to an information user, an information holding device that holds the target information and provides the target information to the information management device, and an information using device that extracts the target information from the information management device. The information using device adds an encryption public key held to a blockchain. The information holding device transmits, to the information management device, encrypted information as a result of acquiring the encryption public key from the blockchain and encrypting the target information. The information management device stores the encrypted information received, and transmits a storage destination address to the information holding device. The information holding device adds the storage destination address of the encrypted information received to the blockchain. The information using device acquires the storage destination address of the encrypted information from the blockchain, and accesses the storage address. The information management device transmits the encrypted information at the storage destination address to the information using device, in response to the access from the information using device. The information using device decrypts the encrypted information received, using an encryption secret key held.

Advantageous Effects of Invention

According to the present invention, the information holding device stores the encrypted information encrypted with the encryption key of the information using device in the information storage device via the blockchain, and uses the information management device via the blockchain to use the information. Since the information using device retrieves the encrypted information and decrypts it using the encryption key of the information using device, the storage destination of the target information is the information management device to be free of the restriction in terms of the data capacity of the blockchain, and is stored in the information management device. Since the target information is encrypted, secure and safe exchange of information can be performed between the information holding device and the information using device, and a trail relating to this operation can be left in the blockchain.

DESCRIPTION OF EMBODIMENT

First Embodiment

Figure 1:
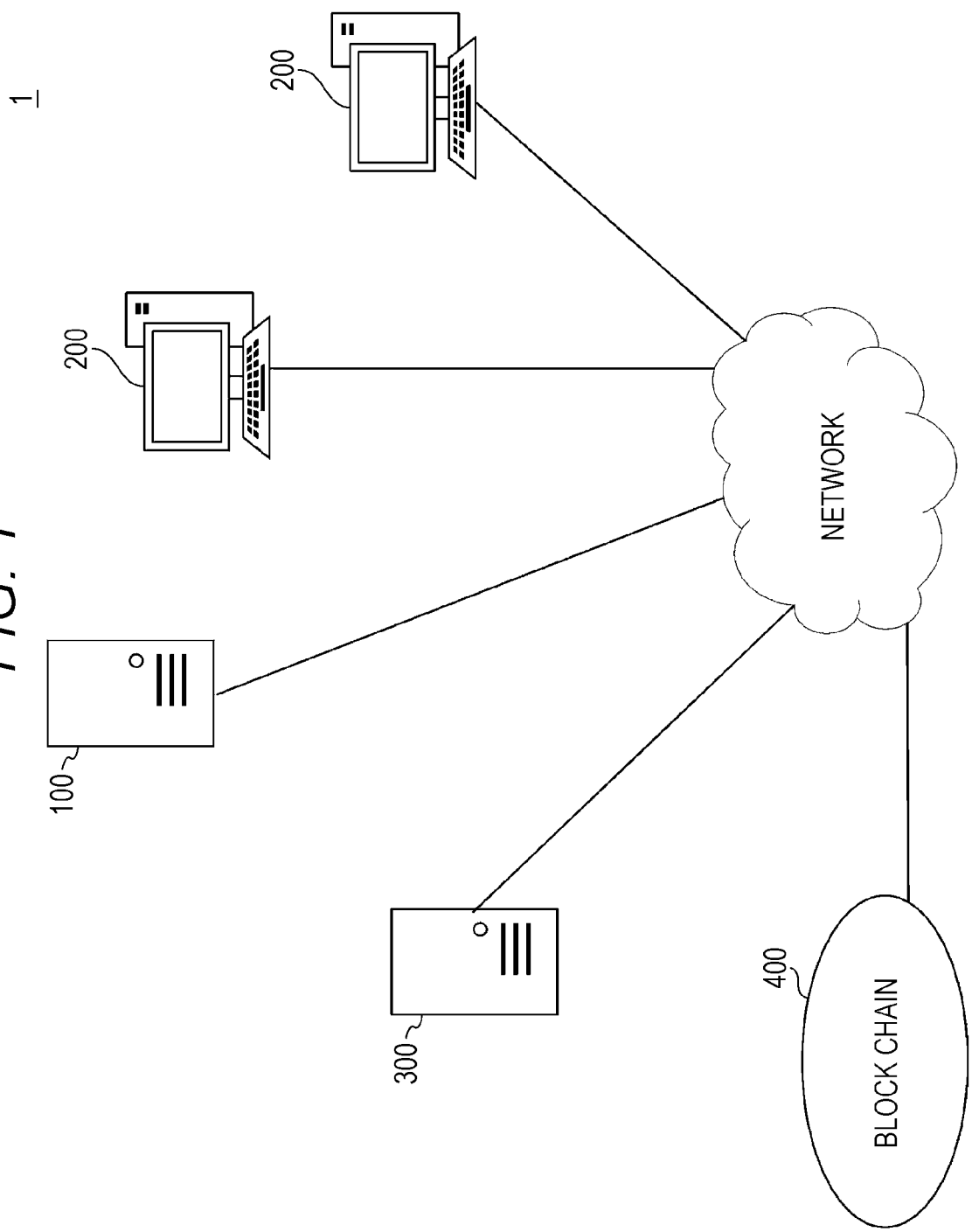
FIG. 1 is a system configuration diagram of an information management system according to a first embodiment of the present invention.

Hereinafter, the same or equivalent components, members, and processes illustrated in each drawing are denoted by the same reference numerals, and the repeated description will be omitted as appropriate. In each drawing, some of the members that are not important for the description are omitted.

FIG. 1 is a configuration diagram of an information management system 1 according to the present embodiment. The information management system 1 includes an information management device 100 that transmits stored target information on an information holder to the information user, an information holding device 200 that has the target information and provides the information management device 100 with the information, an information using device 300 that extracts target information from the information management device 100, and a blockchain 400.

Figure 2:
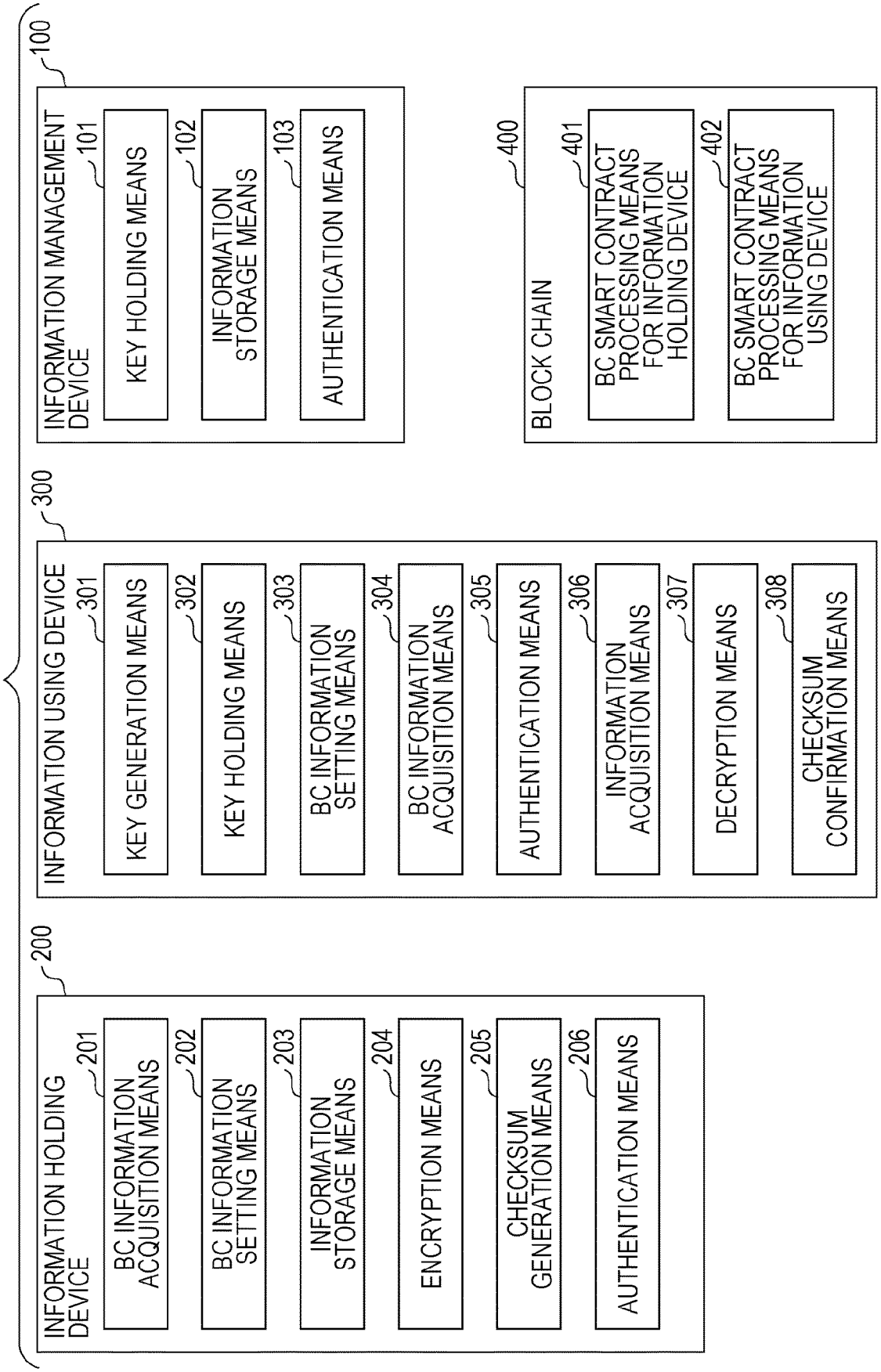
FIG. 2 is a block configuration diagram of system components of the information management system according to the first embodiment of the present invention.
Figure 3:
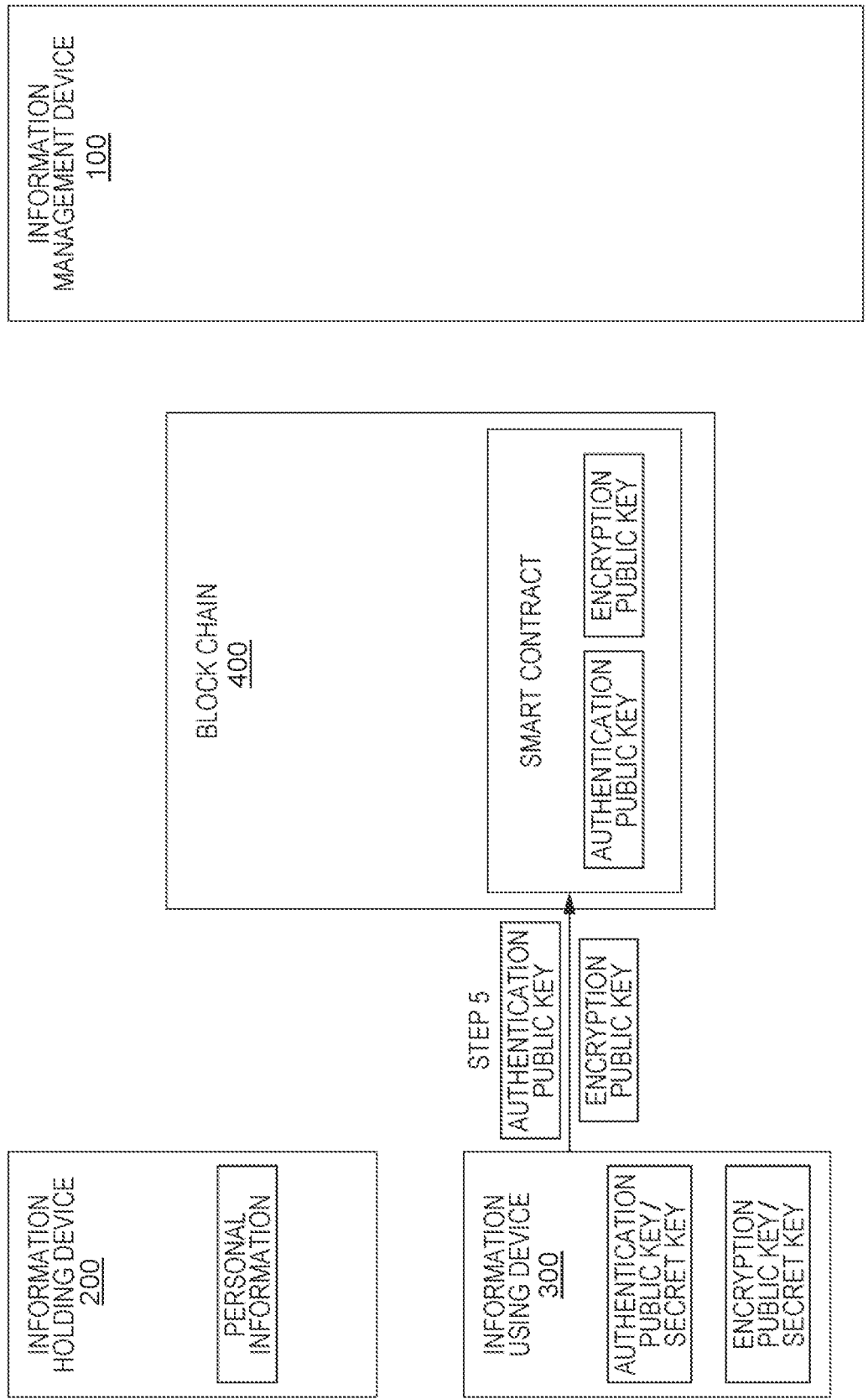
FIG. 3 is an operation explanatory diagram of the information management system according to the first embodiment of the present invention.
Figure 4:
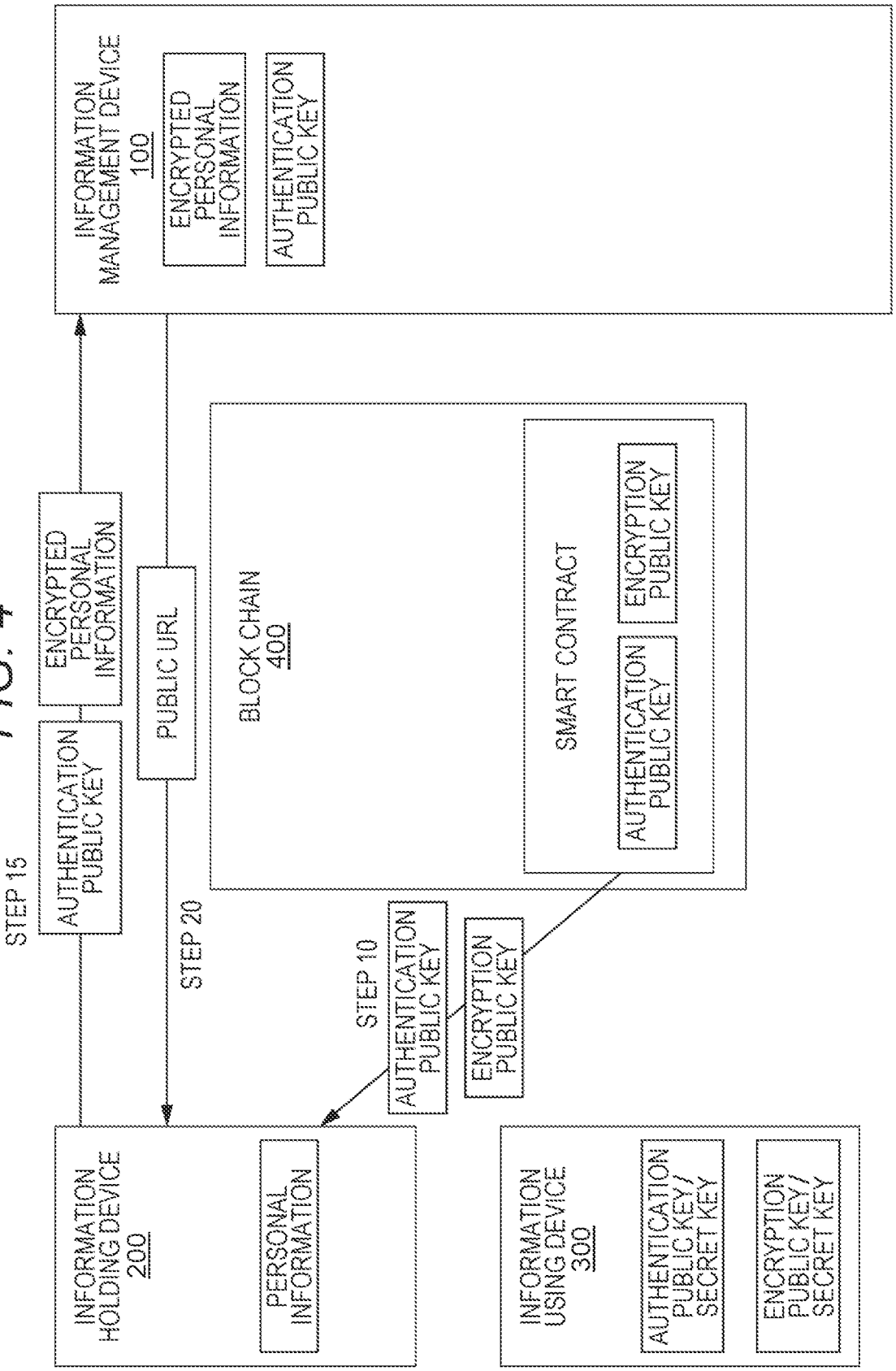
FIG. 4 is an operation explanatory diagram of the information management system according to the first embodiment of the present invention.
Figure 5:
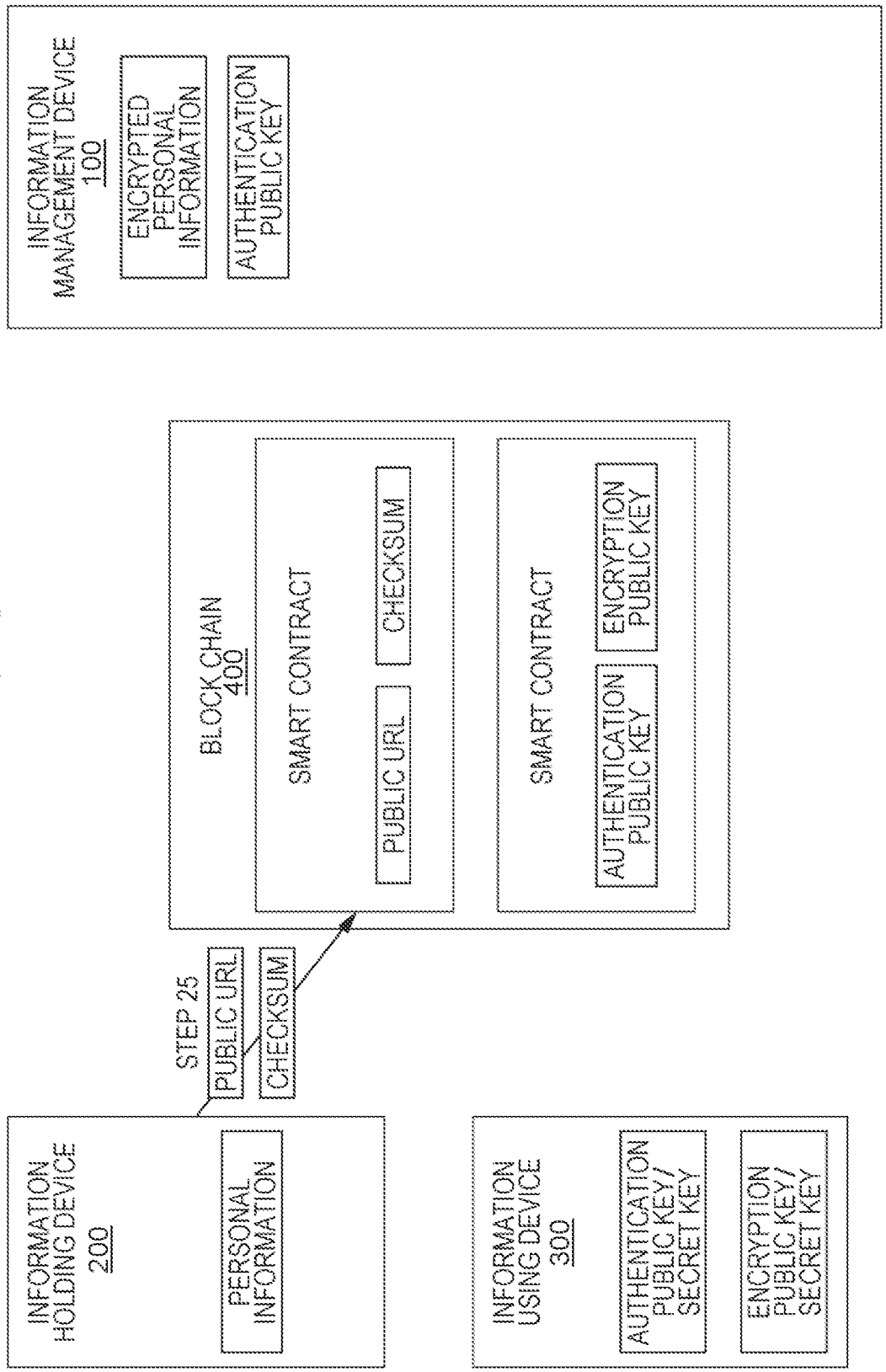
FIG. 5 is an operation explanatory diagram of the information management system according to the first embodiment of the present invention.
Figure 6:
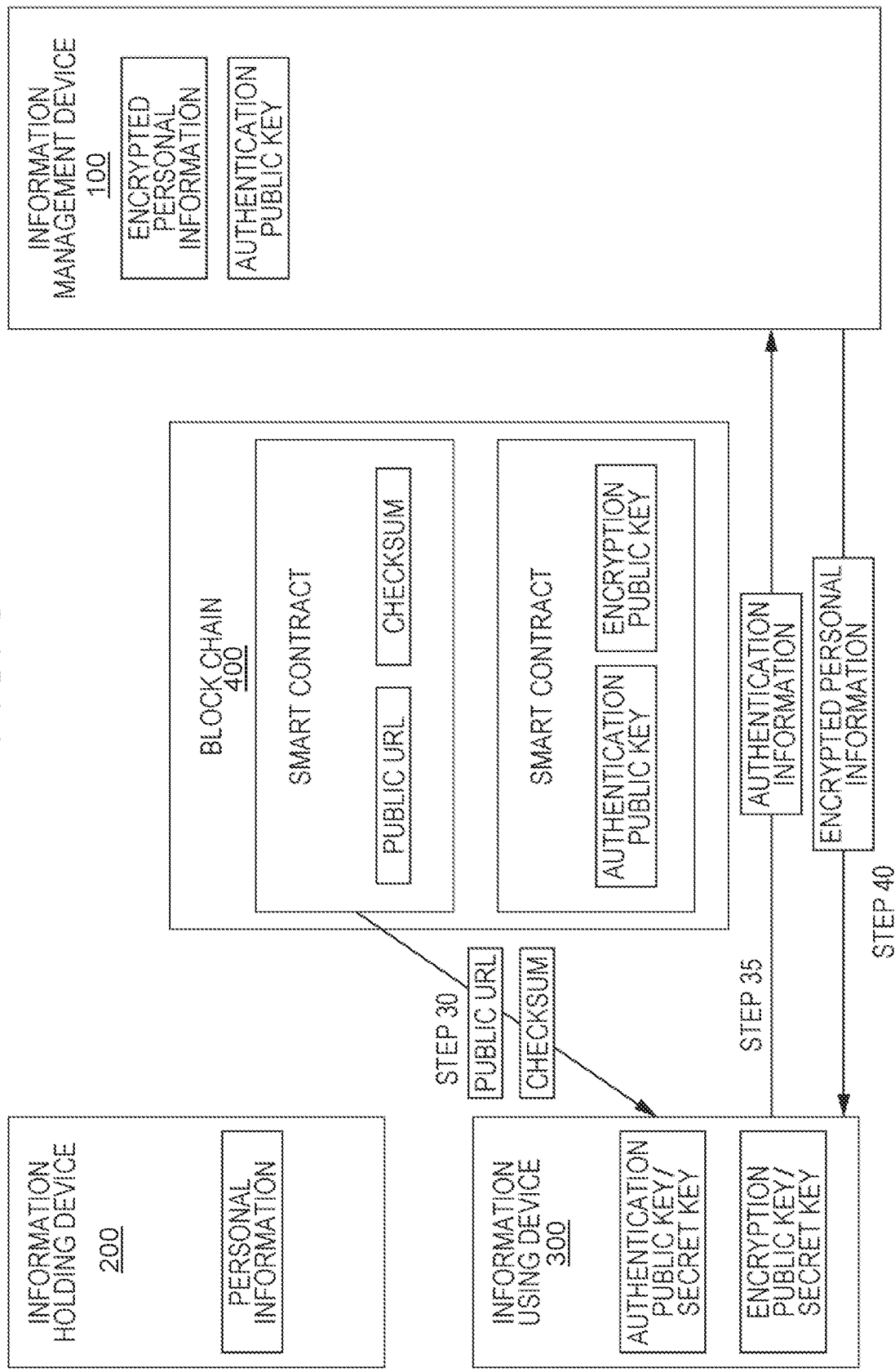
FIG. 6 is an operation explanatory diagram of the information management system according to the first embodiment of the present invention.

Turning to FIG. 2, the information management device 100 includes a key holding means 101 that holds an authentication public key, an information storage means 102 that stores target information received from the information holding device 200, and an authentication means 103 that performs authentication from the information holding device 200 and the information using device 300.

The information holding device 200 includes a BC information acquisition means 201 that accesses the blockchain 400 and refers to metadata, a BC information setting means 202 that accesses the blockchain 400 and setts the metadata, an information storage means 203 that stores the target information, an encryption means 204 that encrypts the target information, a checksum generation means 205 that calculates a checksum of the target information, and an authentication means 206 that makes an authentication request to the information management device 100.

The checksum generation means 205 uses various types of checksum calculations (checksum is a kind of error detection code), such as a CRC checksum and an MD5 checksum, and may use any of these checksum calculations.

The information using device 300 includes a key generation means 301 that generates an encryption key and an authentication key, a key holding means 302 that holds the key generated by the key generation means 301, and a BC information setting means 303 that accesses the blockchain 400 and sets metadata, a BC information acquisition means 304 that accesses the blockchain 400 and refers to the metadata, an authentication means 305 that makes an authentication request to the information management device 100, an information acquisition means 306 that extracts the target information from the information management device 100, a decryption means 307 that decrypts the encrypted target information, and a checksum confirmation means 308 that calculates a checksum of the decrypted target information and compares it with a previously calculated checksum. Naturally, the checksum calculation method employed by the checksum confirmation means 308 is the same as the checksum calculation method employed by the checksum generation means 205.

The key generation means 301 generates an encryption public key and an encryption secret key, as well as an authentication public key and an authentication secret key. The encryption key is generated using a public key cryptosystem for encrypting information using a public key and decrypting the encrypted information using a secret key, and any of various types of public key cryptosystems available can be applied. The authentication key is generated using a public key authentication system (system for generating data for authentication and encrypting the data using a public key by means of a device that performs authentication; decrypting the encrypted data for authentication using a secret key by means of a device that makes an authentication request on the encrypted data for authentication, and confirming whether decryption is properly performed by means of a device that performs authentication), and any of various types of public key authentication systems available can be applied. The encryption public key is used by the information holding device 200 to encrypt the target information. The encryption secret key is used by the information using device 300 to decrypt the encrypted target information. The authentication public key is used when the information holding device 200 makes an authentication request to the information management device 100. The authentication secret key is used when the information using device 300 makes an authentication request to the information management device 100.

The blockchain 400 includes a BC smart contract processing means 401 for the information holding device that receives a request from the information holding device 200 and performs processing on a blockchain platform, and a BC smart contract processing means 402 for the information using device that receives a request from the information using device 300 and performs processing on the blockchain platform. Although specific implementation methods differ depending on the blockchain system, information can be set and referred to in most blockchain systems. For example, in Ethereum, by describing the source code of software to operate (variables and functions (functions for setting variables, functions for referring to variables)) and specifying an account to deploy the source code, and adding the code to the blockchain to generate a contract ID, and specifying this contact ID, the function can be executed. While the user who has deployed the source code understands the content of the deployed source code (contract ABI (contract application binary interface)), the third party does not know it, so that a target user is notified of BC operation information (contract ID and contract ABI) (the information user notifies the information holder of the BC operation information). Through this process, the user who has deployed the source code (e.g., information user) sets a value to a variable using the function for setting the variable (the operation of the BC information setting means 202), and thereafter, another user (e.g., information holder) can refer to the set value of the variable by using the function for referring to the variable (the operation of the BC information acquisition means 304).

Next, the operation of the information management system according to the present embodiment will be described with reference to the operation explanatory diagrams of FIG. 3 to FIG. 6. The key generation means 301 of the information using device 300 generates an authentication public key, an authentication secret key, an encryption public key, and an encryption secret key in advance, and the key holding means 302 holds the authentication public key, the authentication secret key, the encryption public key, and the encryption secret key. The BC information setting means 303 transmits the generated authentication public key and encryption public key to the blockchain 400 (step 5 (FIG. 3)). The BC smart contract processing means 401 for the information holding device of the blockchain 400 receives the authentication public key and the encryption public key transmitted from the information using device 300, and stores the authentication public key and the encryption public key in the blockchain. While personal information is used herein in the description of the operation, the information is not limited to personal information, and may be confidential information, which is a broader concept.

The BC information acquisition means 201 of the information holding device 200 acquires the authentication public key and the encryption public key from the blockchain 400 (step 10 (FIG. 4)). The encryption means 204 encrypts the personal information stored in the information storage means 203 using the encryption public key. The authentication means 206 transmits the authentication public key and the encrypted personal information to the information management device 100 (step 15 (FIG. 4)). Here, the authentication public key is transmitted to the information management device 100 because the authentication public key is used in performing authentication on the information using device 300. The authentication means 103 of the information management device 100 acquires the authentication public key, the information storage means 102 stores the encrypted personal information and transmits a storage destination address where the encrypted personal information is stored to the information holding device 200 (Step 20 (FIG. 4)).

The information holding device 200 receives the storage destination address of the encrypted personal information transmitted from the information management device 100, and the checksum generation means 205 performs a checksum calculation based on the personal information to generate a checksum, and the BC information setting means 202 transmits the storage address of the encrypted personal information and the generated checksum to the blockchain 400 (step 25 (FIG. 5)).

The BC information acquisition means 304 of the information using device 300 acquires the storage address of the encrypted personal information and the checksum from the blockchain 400 (Step 30 (FIG. 6)). The information acquisition means 306 accesses the storage address of the encrypted personal information, and makes an authentication request on the authentication secret key of the key holding means 302 to the information management device 100 (step 35 (FIG. 6)). The information management device 100 receives the authentication request from the information using device 300, performs authentication, and if the authentication is successful, transmits the encrypted personal information to be stored in the information storage means 102 to the information using device 300 (step 40 (FIG. 6)). The decryption means 307 decrypts the received encrypted personal information by using the encryption secret key, and the checksum confirmation means 308 calculates the checksum of the decrypted personal information and compares it with the acquired checksum.

Amount of information that can be exchanged on a blockchain is limited based on the specification of the blockchain regarding the data capacity. With the present embodiment, the information holding device 200 and the information using device 300 can exchange a huge amount of target information securely and while leaving a trail, via the information management device 100 and the blockchain 400 even when the specification of the blockchain used does not allow a large amount of information cannot be transmitted. This is because the encrypted target information is stored in the information management device 100 if the blockchain is provided with the authentication public key and the encryption public key from the information using device 300 as well as the public URL and the checksum from the information holding device 200.

The information management system according to the present embodiment may have a configuration with the following operations added as additional operations. An operation history of each of the following operations may be stored in the blockchain 400.

When the information using device 300 acquires the target information from the information management device 100, the information management device 100 or the information using device 300 notifies the information holding device 200 of the acquisition together with information for identifying the information using device 300 (such as an information user name, information user ID, and an information using device name).

When authentication for the information using device 300 fails for a predetermined number of times in the information management device 100, the information holding device 200 is notified of the failure together with information for identifying the information using device 300 (such as an information user name, information user ID, and an information using device name).

The target information is deleted by the information management device 100 when a predetermined period of time elapses after the information using device 300 has acquired the target information from the information management device 100.

The target information is deleted when the information holding device 200 issues a deletion request for the target public URL to the information management device 100.

The target information is deleted when a predetermined period of time elapses after the target information has been stored by the information management device 100.

The information management system according to the present embodiment may be used for a personal information acquiring operation for opening an account for utilizing a certain system service (for example, an operation in which a company side requests an end user who wants to open an account to upload a file of a photograph on his or her driver's license that is personal information, to acquire the information). In the current information confirmation operation, a company side system issues an upload request to an end user on the Web. When the end user designates a file serving as personal information and performs an upload operation on his or her terminal, the upload is completed. Currently, a secure communication means is used between a company side system and an end user terminal for the personal information confirmation operation. Thus, a risk of personal information being intercepted by a third party on the communication path is not very high. However, the communication means leaves no trail or history of the end user providing the target information to the company, meaning that the end user cannot check the trail or the history. The information management system may be applied to this personal information confirmation operation, to enable such a trail and history to be checked by the end users due to the use of the blockchain 400. In this configuration applied to a personal information confirmation operation, the information holding device 200 is an end user terminal and the information using device 300 is a company side system. The information management device 100 may be established as a company side system, but is preferably established by a fair third party organization. Specifically, the information management device 100 is preferably established by a third party organization with no or low interest in the target company because companies cannot falsify the contents of the blockchain 400 due to the principle of the blockchain, but can falsify the contents of data of the information management device 100.

In the information management system according to the present embodiment, the information holding device 200 generates a checksum. The checksum is stored in the blockchain 400 to be confirmed as the checksum of the blockchain 400 by the information using device 300. However, these are optional configuration. Thus, it is a matter of course that the configuration of the invention according to the present application can be obtained with these configurations omitted.

The information management system according to the present embodiment may not reuse the authentication public key, the authentication secret key, the encryption public key, and the encryption secret key used once after being generated by the information using device 300. Alternatively, the keys may be reused by any information holder. For example, after the operation of the information management system according to the present embodiment has been performed once with an authentication public key $\alpha$, an authentication secret key $\beta$, an encryption public key $\gamma$, and an encryption secret key $\delta$ generated by an information user B for an information holder A, the information user B needs not to newly generate an authentication public key, an authentication secret key, an encryption public key, and an encryption secret key for a new information holder C, and the information holder C may use the existing authentication public key $\alpha$, authentication secret key $\beta$, encryption public key $\gamma$, and encryption secret key $\delta$. This configuration raises no problem in terms of security because the authentication secret key $\mu$ and the encryption secret key $\delta$ are held only by the information user B. Furthermore, the configuration is free of confusion that seem to occur when the same authentication public key $\alpha$ and encryption public key $\gamma$ used are used with the personal information about the information holder A and the personal information about the information holder C stored in the information management device. This is because in the information management device 100, the information pieces are stored in different storage area and at different timings, and different storage destination addresses are generated.

In the information management system according to the present embodiment described above, the information holding device 200 provides a single piece of information to the information using device 300. However, a plurality of pieces of information can also be exchanged. In such a case, the authentication public key, authentication secret key, encryption public key, and encryption secret key may be generated for each piece of information. Alternatively, the same authentication public key, authentication secret key, encryption public key, and encryption secret key may be used between the same pair of information holding device 200 and information using device 300 to exchange a plurality of pieces of information. In such a configuration, the process in step 15 includes encrypting not only the first piece of information but also the second piece of information and after using the encryption public key in the information holding device 200; and transmitting the authentication public key and a plurality of pieces of encrypted information to the information management device 100. The information management device 100 transmits a public URL storing the encrypted information to the information holding device 200 for each encrypted information (note that a plurality of pieces of encrypted information may be collectively stored (in a folder) and a single public URL (the URL of the folder) may be transmitted). The information holding device 200 transmits a plurality of public URLs (one public URL for each encrypted information) and a plurality of checksums (one checksum for each information) to the blockchain 400.

The information using device 300 accesses the information management device 100 and performs the authentication for each public URL, to acquire the encrypted information. Here, for a plurality of pieces of encrypted information, authentication may be performed only once, that is, the authentication may be omitted after the first access. For example, this can be achieved using a known technique enabling a website that has been authenticated once to be accessed again without the need for the authentication even when the access is from a different URL.

INDUSTRIAL APPLICABILITY

The present invention can be suitably used for an information management system that encrypts and stores information and decrypts encrypted information to provide information.

REFERENCE SIGNS LIST

1 Information management system
100 Information management device
101 Key holding means
102 Information storage means
103 Authentication means
200 Information holding device
201 BC information acquisition means
202 BC information setting means
203 Information storage means
204 Encryption means
205 Checksum generation means
206 Authentication means
300 Information using device
301 Key generation means
302 Key holding means
303 BC information setting means
304 BC information acquisition means
305 Authentication means
306 Information acquisition means
307 Decryption means
308 Checksum confirmation means
400 Blockchain
401 BC smart contract processing means for information holding device
402 BC smart contract processing means for information using device

The invention claimed is:

1. An information management system comprising: an information management device that transmits target information of an information holder stored to an information user; an information holding device that holds the target information and provides the target information to the information management device; and an information using device that extracts the target information from the information management device, wherein the information using device adds an encryption public key of the information using device and an authentication public key of the information using device to a blockchain, the information holding device transmits, to the information management device, encrypted information and the authentication public key of the information using device as a result of acquiring the encryption public key of the information using device and the authentication public key of the information using device from the blockchain and encrypting the target information using the encryption public key, the information management device stores the encrypted information and the authentication public key of the information using device received, and transmits a storage destination address of the encrypted information to the information holding device, the information holding device generates a checksum of pre-encryption information of the encrypted information and adds the storage destination address of the encrypted information received to the blockchain together with the checksum, the information using device acquires the storage destination address of the encrypted information and the checksum from the blockchain, and accesses the storage address, the information management device performs authentication of the information using device using the authentication public key of the information using device that is stored in the information management device in response to the access from the information using device, and in response to successful authentication of the information using device, transmits the encrypted information at the storage destination address to the information using device, and the information using device decrypts the encrypted information received, using an encryption secret key of the information using device, and checks whether the checksum from the blockchain and a checksum generated from decrypted information of the encrypted information using the encryption secret key matches.

2. The information management system according to claim 1, wherein
when the information using device acquires the target information from the information management device, the information management device or the information using device notifies the information holding device of the acquisition together with information for identifying the information using device.

3. The information management system according to claim 1, wherein
when authentication for the information using device fails for a predetermined number of times in the information management device, the information management device notifies of the failure together with information for identifying the information using device.

4. The information management system according to claim 1, wherein
the information management device deletes the target information stored therein when a predetermined period of time elapses after the information using device has acquired the target information from the information management device.

5. The information management system according to claim 1, wherein
the information management device deletes the target information stored therein in response to receiving a deletion request from the information holding device.

6. The information management system according to claim 1, wherein
the information management device deletes the target information stored therein when a predetermined period of time elapses after the target information has been stored in the information management device.

7. The information management system according to claim 1, wherein the pre-encryption information of the encrypted information is the target information in plain text.

8. An information management method that uses an information management device that transmits target information of an information holder stored to an information user, an information holding device that holds the target information and provides the target information to the information management device, and an information using device that extracts the target information from the information management device, the information management method comprising:

by the information using device, adding an encryption public key of the information using device and an authentication public key of the information using device to a blockchain;

by the information holding device, transmitting, to the information management device, encrypted information and the authentication public key of the information using device as a result of acquiring the encryption public key of the information using device and the authentication public key of the information using device from the blockchain and encrypting the target information using the encryption public key;

by the information management device, storing the encrypted information of the information using device and the authentication public key received, and transmitting a storage destination address of the encrypted information to the information holding device;

by the information holding device, generating a checksum of pre-encryption information of the encrypted information and adding the storage destination address of the encrypted information received to the blockchain together with the checksum;

by the information using device, acquiring the storage destination address of the encrypted information from the blockchain and the checksum, and accessing the storage address;

by the information management device, performing authentication of the information using device using the authentication public key of the information using device that is stored in the information management device in response to the access from the information using device, and in response to successful authentication of the information using device, transmitting the encrypted information at the storage destination address to the information using device; and by the information using device, decrypting the encrypted information received, using an encryption secret key of the information using device, and checking whether the checksum from the blockchain and a checksum generated from decrypted information of the encrypted information using the encryption secret key matches.

9. The information management method according to claim 8, wherein the pre-encryption information of the encrypted information is the target information in plain text.

* * * * *